United States Patent
Iwasaki et al.

(10) Patent No.: US 9,143,025 B2
(45) Date of Patent: Sep. 22, 2015

(54) MAGNETIC GEAR MECHANISM INCLUDING A PLURALITY OF ROTORS OR STATORS

(75) Inventors: Norihisa Iwasaki, Hitachinaka (JP); Yuji Enomoto, Hitachi (JP); Junnosuke Nakatsugawa, Hitachi (JP); Masashi Kitamura, Mito (JP); Kinya Kobayashi, Hitachi (JP); Hironori Matsumoto, Hitachinaka (JP)

(73) Assignee: HITACHI, LTD., Tokyo (JP)

( * ) Notice: Subject to any disclaimer, the term of this patent is extended or adjusted under 35 U.S.C. 154(b) by 512 days.

(21) Appl. No.: 13/538,490

(22) Filed: Jun. 29, 2012

(65) Prior Publication Data
US 2013/0002076 A1    Jan. 3, 2013

(30) Foreign Application Priority Data
Jun. 29, 2011    (JP) .................................. 2011-143724

(51) Int. Cl.
H02K 49/10    (2006.01)

(52) U.S. Cl.
CPC .................................... *H02K 49/102* (2013.01)

(58) Field of Classification Search
CPC ............................. H02K 49/10; H02K 49/102
USPC ............................. 310/103, 104, 156.36, 266
See application file for complete search history.

(56) References Cited

U.S. PATENT DOCUMENTS

2004/0108781 A1*  6/2004  Razzell et al. ................ 310/266
2006/0028083 A1    2/2006  Costin et al.
2008/0238232 A1* 10/2008  Bando et al. ................. 310/126
2011/0012458 A1*  1/2011  Atallah et al. ................ 310/103
2011/0121672 A1*  5/2011  Calverley et al. ............ 310/103

FOREIGN PATENT DOCUMENTS

CN    102077442 A     5/2011
WO   2009/087408 A2   7/2009

OTHER PUBLICATIONS

Chinese Office Action with English Translation, Chinese Patent Appln. No. 201210214880.3, Mar. 5, 2014, 10 pp.
T. Ikeda et al, "Consideration of Rotor Structure in Permanent-Magnet Magnetic Gears", Journal of the Magnetics Society of Japan, vol. 34, No. 3, pp. 380-384, 2010.
T. Ikeda et al, "A Way to Improve Efficiency of Permanent-Magnet Magnetic Gears", Journal of the Magnetics Society of Japan, vol. 33, No. 2, pp. 130-134, 2009.
K. Atallah and D. Howe, "A Novel High-Performance Magnetic Gear" IEEE Transactions on Magnetics, vol. 37, No. 4, pp. 2844-2846, Jul. 2001.

* cited by examiner

*Primary Examiner* — Michael Andrews
(74) *Attorney, Agent, or Firm* — Volpe and Koenig, P.C.

(57) ABSTRACT

A magnetic gear mechanism including a simplified assembly of a magnetic flux modulating section in the magnetic gear mechanism which improves the strength thereof. In the magnetic flux modulating section of the magnetic gear mechanism, the magnetic flux modulating section being formed of a magnetic member and a non-magnetic member, a piece of the magnetic member and a piece of the non-magnetic member are separately produced. The piece of the magnetic member is sandwiched between circumferential projections provided in pieces of the non-magnetic member, and the magnetic member and the non-magnetic member and bearing holding sections form a structure in which the magnetic member and the non-magnetic member are fitted into the bearing holding sections by using recessed portions provided in the bearing holding sections and axial projections provided in the pieces of the non-magnetic member. This structure simplifies production and improves strength.

2 Claims, 7 Drawing Sheets

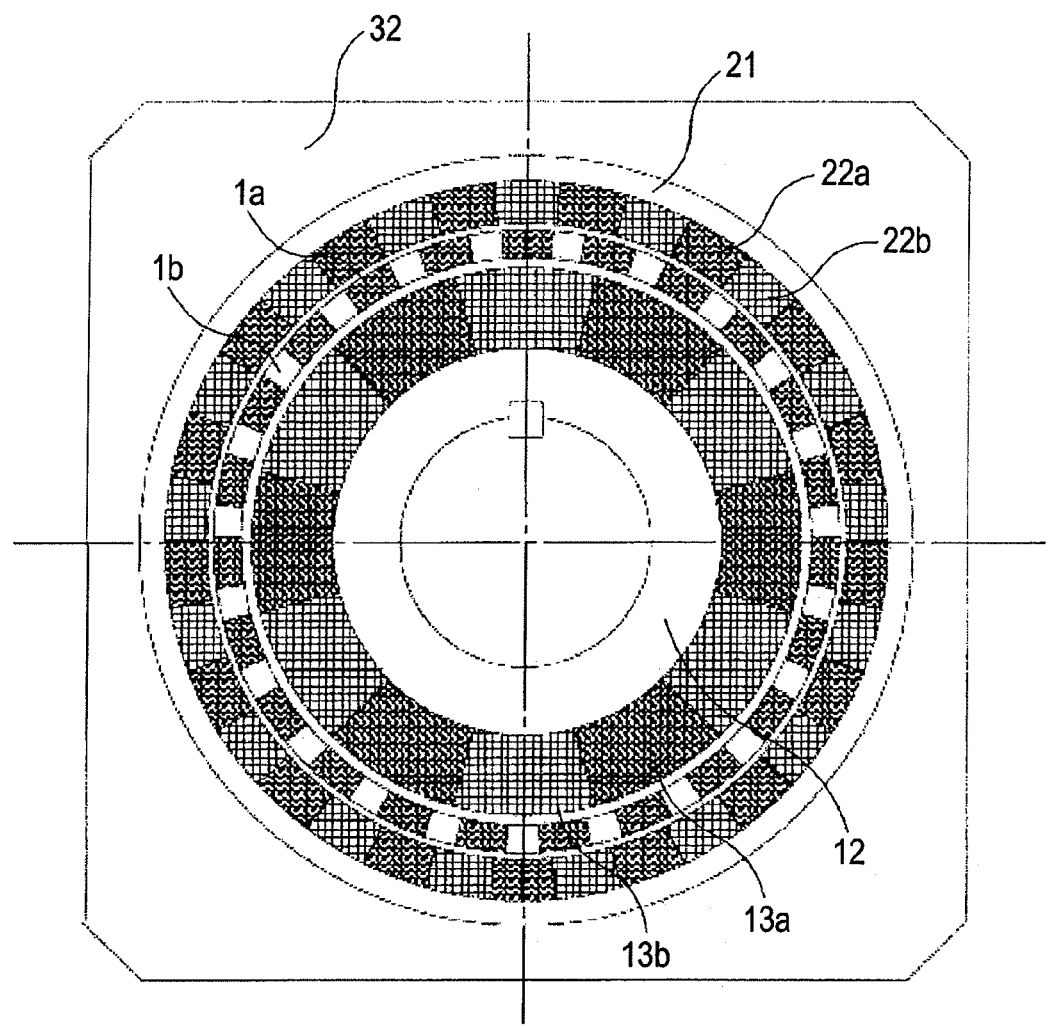

FIG. 4A
FIG. 4B
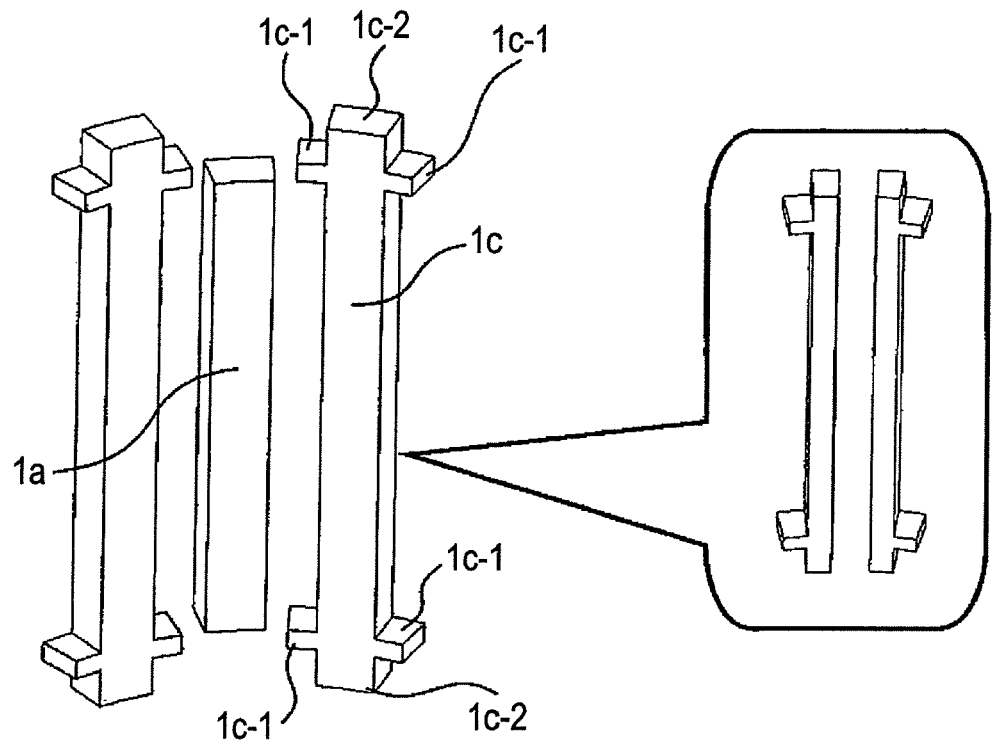
FIG. 4C
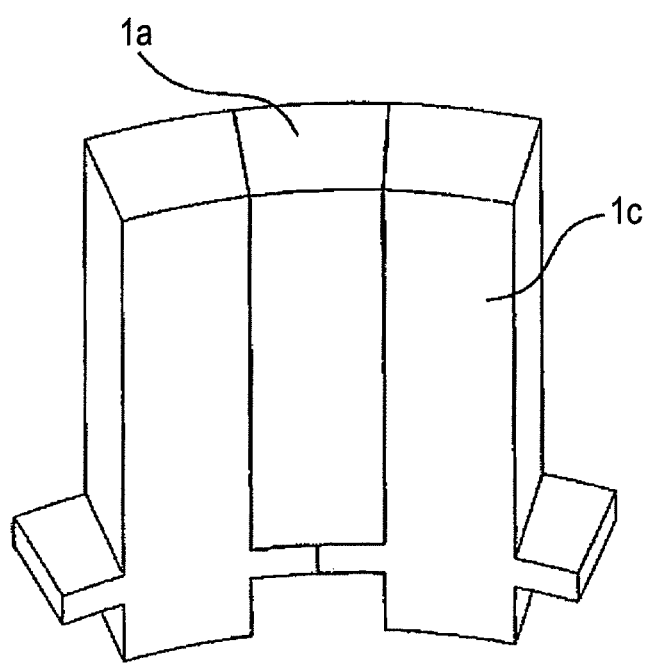

FIG. 6A
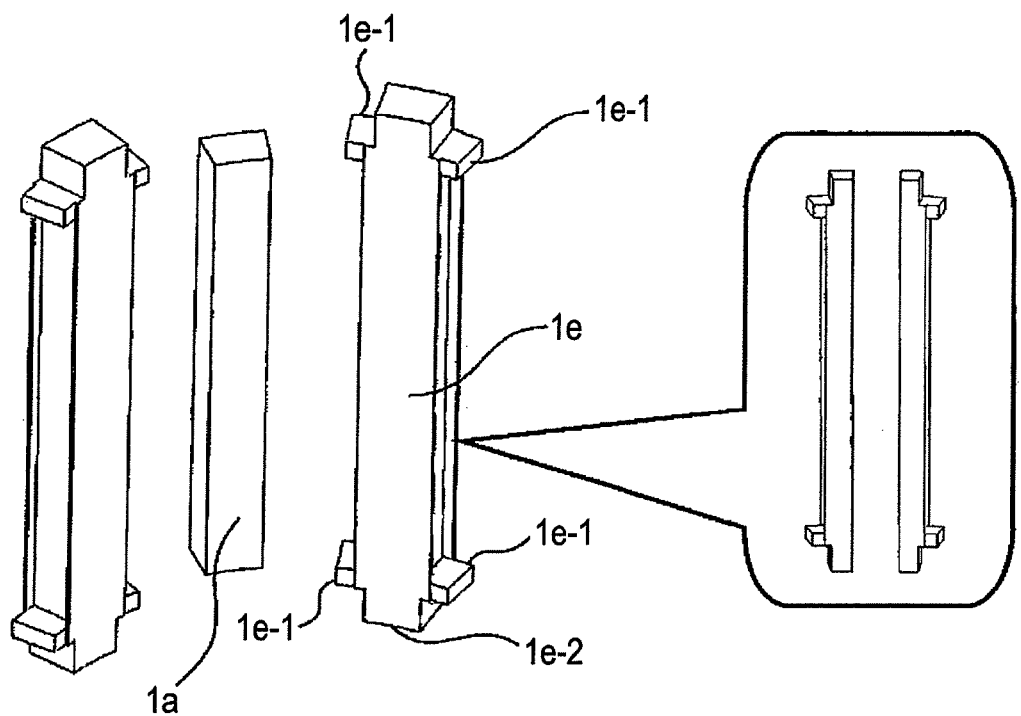
FIG. 6B
FIG. 6C
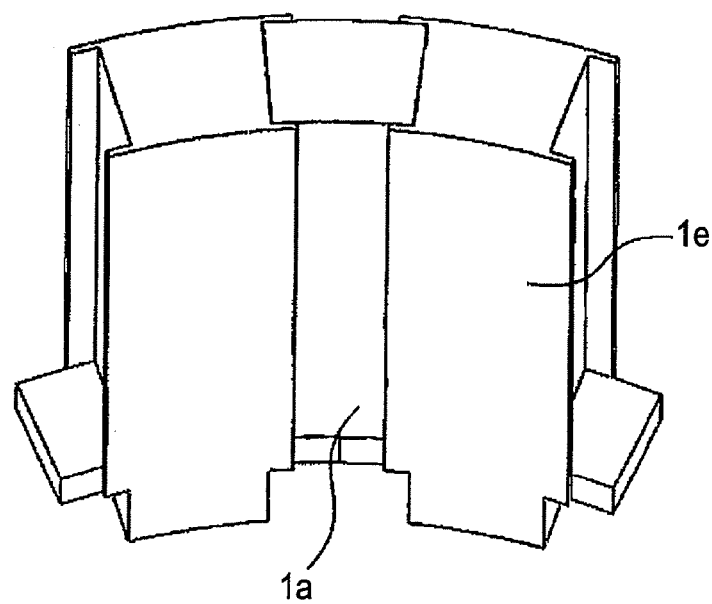

FIG. 7A
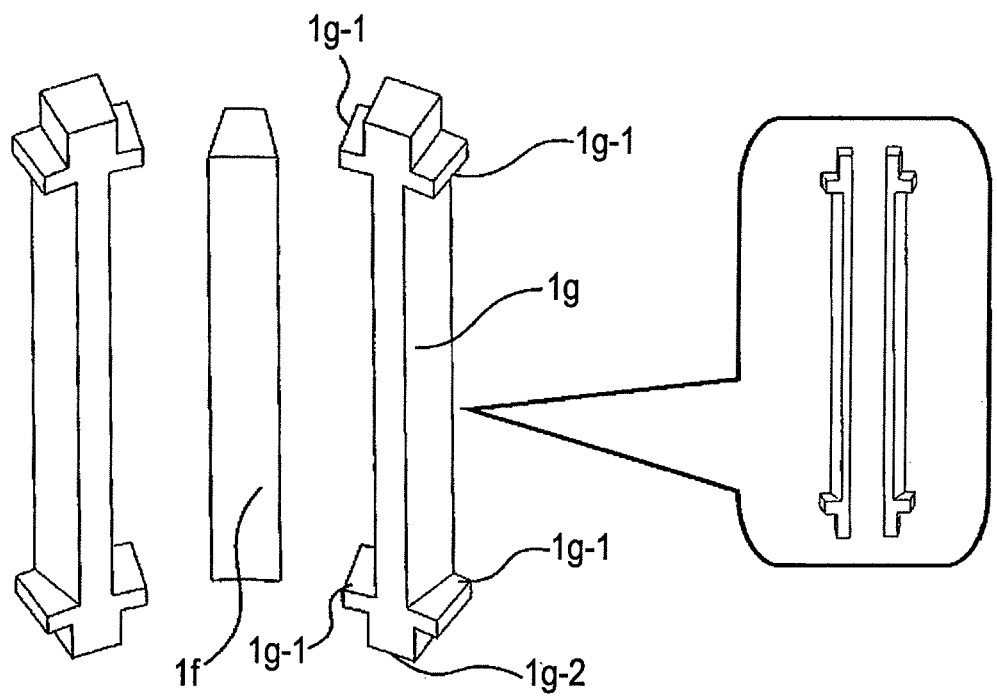
FIG. 7B
FIG. 7C
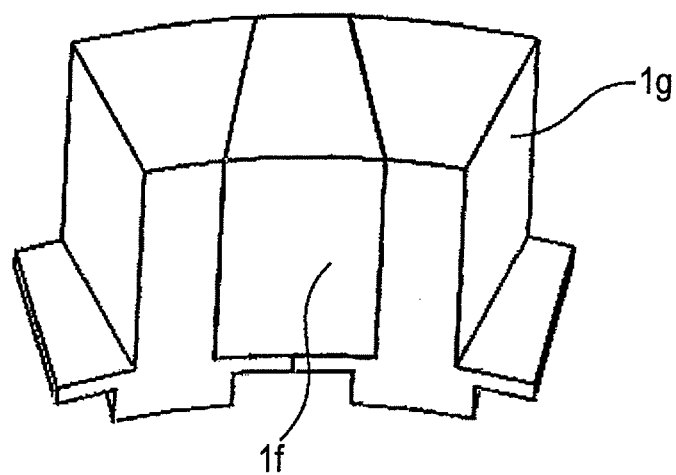

MAGNETIC GEAR MECHANISM INCLUDING A PLURALITY OF ROTORS OR STATORS

BACKGROUND OF THE INVENTION

1. Field of the Invention

The present invention relates to magnetic gear mechanisms.

2. Description of the Related Art

In recent years, products to which a rotary machine is applied have various specifications for different purposes, such as specifications that require high torque or high-speed rotation. For example, since a wind generator has a wind turbine rotating at a few hundred r/min which is a very low speed, it is impossible to produce electricity even when the wind turbine is connected to a generator. The rotation speed has to be converted into a higher speed to produce electricity. In order to produce electricity, the wind turbine and the generator are connected by a gear to increase the rotation speed. Moreover, a transmission of an automobile is a system that converts the power produced by an engine into appropriate torque and number of revolutions arbitrarily or automatically depending on the travelling state of the automobile, and a gear is used also for this conversion. As described above, in applications to which the rotary machine is applied, the gear is widely used. In addition, most of currently used gears are mechanical gears. The mechanical gear has many practical problems such as the need for maintenance when the lubricant oil becomes insufficient or a tooth becomes chipped, high noise, and the like. It is against this background that a magnetic gear using non-contact magnetic attraction and repelling force has been studied, but an existing magnetic gear had not been put to practical use due to a small area of a portion in which magnets face each other and a low torque density. However, a magnetic flux modulated type magnetic gear has recently been proposed and a magnetic gear with a high torque density has been implemented (K. Atallah and D. Howe: A Novel High-Performance Magnetic Gear: IEEE Transactions on Magnetics, Vol. 37, No. 4, pp. 2844-2846 (hereinafter, Non-Patent Document 1)). Moreover, eddy current loss etc. in a magnetic gear has also been studied ("A Way to Improve Efficiency of Permanent-Magnet type Magnetic Gears", Journal of the Magnetics Society of Japan Vol. 33, No. 2, 2009 (hereinafter, Non-Patent Document 2) and "Consideration of Rotor Structure in Permanent-Magnet Magnetic Gears", Journal of the Magnetics Society of Japan Vol. 34, No. 3, 2010 (hereinafter, Non-Patent Document 3)). The technology related to positioning, a method of fixation, and improvement of strength of a group of pole pieces in a magnetic flux modulating section is described in WO 2009/087408 (hereinafter, Patent Document 1).

Non-Patent Document 1 described above introduces the principles and magnetic characteristics of a magnetic gear and does not study the mechanism and strength thereof. Moreover, in Non-Patent Documents 2 and 3 described above, eddy current loss etc. in a magnetic gear is studied, but the mechanism and strength of the magnetic gear are not studied.

On the other hand, in Patent Document 1 described above, a method by which the whole of a group of pole pieces is formed by molding, the pole pieces disposed at regular intervals in a circumferential direction, is disclosed. However, the strength is insufficient for forming the whole of a group of pole pieces by molding by using resin or the like, and consideration has to be given to cracks appearing after molding. Moreover, molding increases the number of working processes and requires longer working hours. For this reason, the above-described method has many problems from the point of view of putting this method to practical use. Likewise, in Patent Document 1 described above, a method by which an end ring is formed at an end of a group of pole pieces disposed at regular intervals in a circumferential direction and the group of pole pieces is fixed is disclosed. In this document, two methods are described. One of them is a technique of forming the end ring integrally with the group of pole pieces. The group of pole pieces is literally made of a soft magnetic material such as a magnetic steel sheet, a dust core, amorphous metal, and Permendur. Therefore, when the end ring is formed integrally with the group of pole pieces, the end ring is formed also of a magnetic substance, and a magnetic flux is likely to flow toward the end ring side. This greatly impairs the torque performance. Thus, the above-described method is undesirable. The other is a method by which an end ring is formed as a non-magnetic member and the end ring is welded to the group of pole pieces at an end thereof. In this case, only the welded area is used to maintain the strength, it is difficult to perform positioning at the time of production, and the working process becomes complicated, resulting in increased production costs.

SUMMARY OF THE INVENTION

In view of the problems mentioned above, it is an object of the present invention to provide a magnetic gear mechanism that can enhance the torque performance and can be easily assembled.

To solve the problems mentioned above, for example, in a magnetic gear mechanism having a plurality of rotors or stators having a plurality of magnetic poles, the rotors or stators between which a group of pole pieces for magnetic flux modulation is provided, an output shaft-integrated bearing holding section provided with recessed portions, a magnetic flux modulating section formed of nonconductive and non-magnetic members, each having a projection and being split, sandwiching a pole piece, the nonconductive and non-magnetic members arranged in a circumferential direction, and a non-output-side bearing holding section provided with recessed portions form a structure in which the magnetic flux modulating section is fitted into the output shaft-integrated bearing holding section and the non-output-side bearing holding section. This makes it possible to form a magnetic flux modulating section that has high strength and is easy to assemble.

The main effects of the invention are briefly described as follows. According to the invention, it is possible to produce individual parts separately, perform assembly with ease, and improve strength. Moreover, by forming a pole piece holding section as a non-magnetic and nonconductive pole piece holding section and providing a projection between the pole piece holding section and the bearing holding section, insulation between the pole piece and the bearing holding section can also be provided.

BRIEF DESCRIPTION OF THE DRAWINGS

FIG. 2 is a sectional view showing the structure of a magnetic circuit section of the magnetic gear mechanism of the invention, the sectional view perpendicular to an axial direction;

FIGS. 4A to 4C are diagrams showing the structural components of a magnetic flux modulating section of a second embodiment of the invention;

FIGS. 6A to 6C are diagrams showing the structural components of a magnetic flux modulating section of a fourth embodiment of the invention; and FIGS. 7A to 7C are diagrams showing the structural components of a magnetic flux modulating section of a fifth embodiment of the invention.

DESCRIPTION OF THE PREFERRED EMBODIMENTS

Hereinafter, embodiments of a magnetic gear mechanism according to the invention will be described by using the drawings. In the following embodiments, a radial gap magnetic gear mechanism will be described as an example. However, other types (for example, an axial gap magnetic gear mechanism and a linear magnetic gear mechanism) can also be implemented in a similar manner.

First Embodiment

Figure 1:
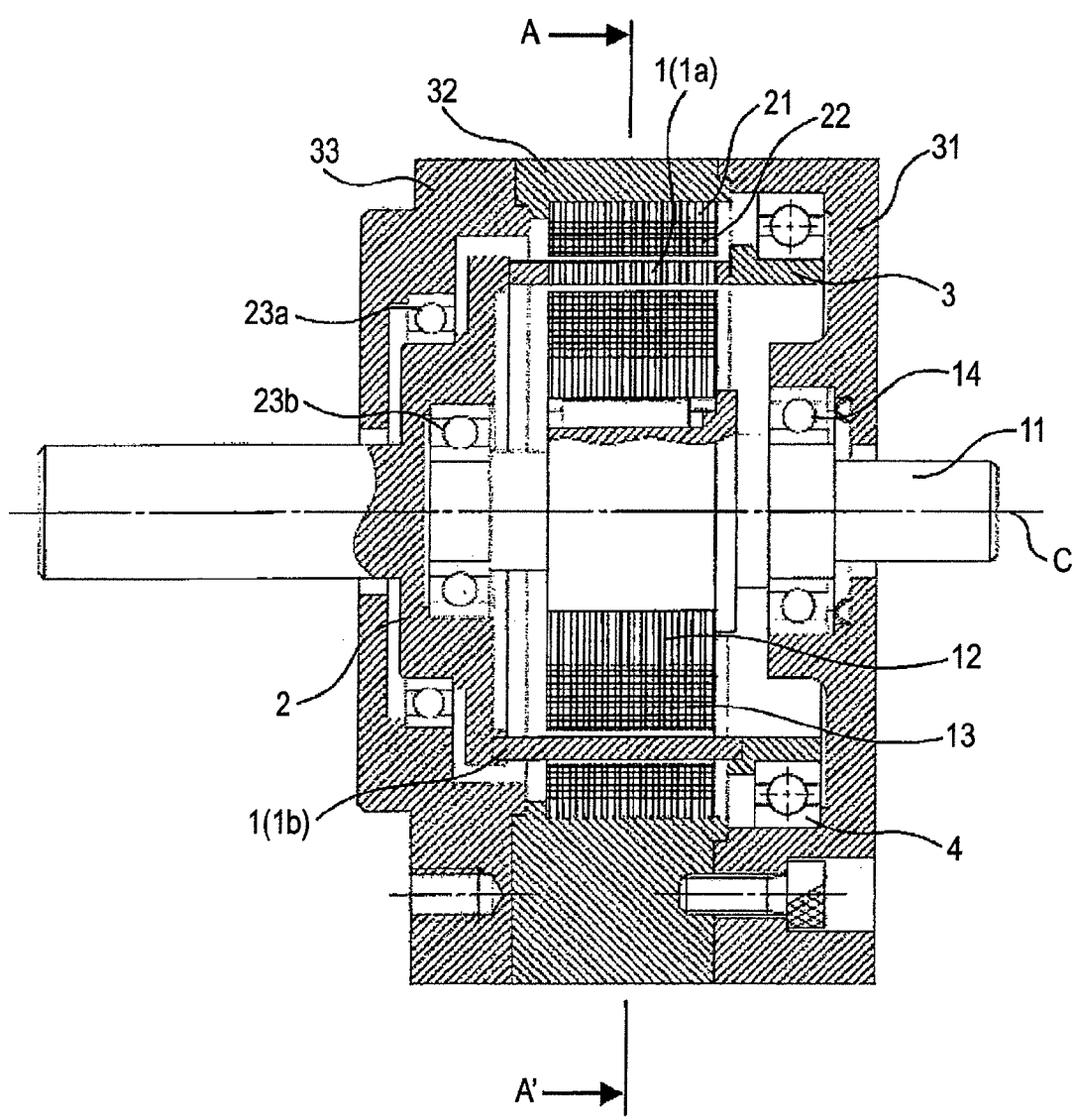
FIG. 1 is an axial sectional view of a magnetic gear mechanism of the invention.

First, a first embodiment according to the invention will be described by using FIGS. 1 and 2 and FIGS. 3A to 3D. FIG. 1 is an axial sectional view of a magnetic gear mechanism of the invention. Moreover, FIG. 2 is a sectional view taken on the line A-A', the sectional view of a magnetic circuit section of the magnetic gear mechanism shown in FIG. 1. FIGS. 3A to 3D depict the structural components of a magnetic flux modulating section 1 in the magnetic circuit section shown in FIG. 2 and an assembly method.

First, the overall structure will be described by using FIG. 1. In a magnetic gear, a rear bracket 31, a radial housing 32, and a front bracket 33 form an enclosure.

A shaft 11 projecting rightward in the drawing is a rotor shaft for high-speed rotation. The shaft 11 is supported by a bearing 14 disposed in the rear bracket 31 and a bearing 23*b* disposed in an output shaft-integrated bearing holding section projecting leftward in the drawing. The output shaft-integrated bearing holding section 2 will be described later. A rotating body for high-speed rotation includes the shaft 11 and an iron core 12 made of a soft magnetic material such as a magnetic steel sheet, a dust core, amorphous metal, and Permendur and is held in a state in which the iron core 12 is stacked on the outside (outer periphery) of the shaft 11 in an axial direction. Furthermore, on the outside (outer periphery) of the iron core 12, a plurality of permanent magnets 13 are disposed in a circumferential direction in such a way that the directions of poles of permanent magnets 13 lying next to each other become a radially inward direction and a radially outward direction. The permanent magnets 13 may stick to the surface of the iron core 12, or a structure in which a hole into which the permanent magnets 13 are inserted is provided near the surface of the iron core 12 and the permanent magnets 13 are inserted into the hole may be adopted. When the permanent magnets 13 stick to the surface of the iron core 12, since the distance over which the torque is transferred is reduced, the torque performance is enhanced. When the permanent magnets 13 are inserted into the hole, the permanent magnets 13 are prevented from being scattered in a radial direction by the centrifugal force depending on the number of revolutions and eddy current loss caused by a magnetic flux that alternates from the outside in a radial direction is reduced. In this case, a circumferential portion and a radially outer portion of the hole into which the permanent magnets 13 are inserted are formed to have a thickness that is sufficient for maintaining the strength of the rotor and is as thin as possible.

On the inner side (inner periphery) of the housing 32 located on the outermost part in a radial direction, an iron core 21 made of a soft magnetic material such as a magnetic steel sheet, a dust core, amorphous metal, and Permendur and stacked in an axial direction is held. On the inner side (inner periphery) of the iron core 21, a plurality of permanent magnets 22 are disposed in a circumferential direction in the same manner as previously described in such a way that the directions of poles of permanent magnets 22 lying next to each other become a radially inward direction and a radially outward direction. As is the case with the permanent magnets 13 described above, the permanent magnets 22 may stick to the surface of the iron core 21, or a structure in which a hole is provided near the surface of the iron core 21 and the permanent magnets 22 are inserted into the hole may be adopted. The advantages are the same as those described above. In this way, a stator is formed on the outside.

The magnetic flux modulating section 1 is placed between the permanent magnets 13 placed on the inner high-speed rotating body and the permanent magnets 22 placed on the outer stator with a gap left between the magnetic flux modulating section 1 and the permanent magnets 13 and between the magnetic flux modulating section 1 and the permanent magnets 22. The magnetic flux modulating section 1 is formed of pieces of magnetic member made of a soft magnetic material such as a magnetic steel sheet, a dust core, amorphous metal, and Permendur, the pieces disposed at predetermined intervals in a circumferential direction, and is held by a non-output-side bearing holding section 3 and the output shaft-integrated bearing holding section 2. Moreover, the output shaft-integrated bearing holding section 2 is supported by a bearing 23*a* disposed in the front bracket 33 and the bearing 23*b* placed on the shaft 11 on the high-speed rotation side, and rotates at low speed relative to the shaft 11 on the high-speed rotation side.

Next, the relationship between the number of poles and the gear ratio in the above-described magnetic gear mechanism will be described by using FIG. 2. FIG. 2 depicts a cross section taken on the line A-A' in FIG. 1. First, a rotor for high-speed rotation is disposed on the innermost periphery side in a radial direction and is formed of the iron core 12 made of a soft magnetic material and the permanent magnets 13 disposed on the outside of the iron core 12 in a circumferential direction in such a way that the directions of poles of permanent magnets 13*a* and 13*b* lying next to each other become a radially inward direction and a radially outward direction. In this embodiment, the number of pole pairs of the inner rotor is set at 6 (12 poles).

The stator located on the outermost periphery side is held by the housing 32 and is formed of the iron core 21 made of a soft magnetic material such as a magnetic steel sheet, a dust core, amorphous metal, and Permendur and the permanent magnets 22 disposed on the inside of the iron core 21 in a circumferential direction in such a way that the directions of poles of permanent magnets 22*a* and 22*b* lying next to each other become a radially inward direction and a radially outward direction. In this embodiment, the number of pole pairs of the outer stator is set at 17 (34 poles).

The magnetic flux modulating section 1 is disposed between the inner rotor and the outer stator with a gap left between the magnetic flux modulating section 1 and the inner rotor and between the magnetic flux modulating section 1 and the outer stator. The magnetic flux modulating section 1 is formed of magnetic members 1a made of a soft magnetic material and non-magnetic members 1b or air space, the magnetic members 1a and the non-magnetic members 1b or air space which are disposed alternately.

In the above-described case, the number of pole pairs of the inner rotor is 6 and the number of pole pairs of the outer stator is 17, and the number of magnetic members 1a in the magnetic flux modulating section 1 in a circumferential direction is 23 (=6+17). The gear ratio is determined by the number of poles of a rotating portion. In this case, since the outermost periphery side is fixed, the inner rotor and the magnetic flux modulating section 1 disposed on the outside of the inner rotor rotate. Since the number of magnetic members 1a of the magnetic flux modulating section 1 is 23 and the number of pole pairs of the inner rotor is 6, the gear ratio is 3.83 (=23÷6). A side with a smaller number of poles rotates at high speed, and a side with a greater number of poles rotates at low speed relative to the high-speed rotating body.

In this embodiment, the outer side is fixed. However, even when the magnetic flux modulating section 1 and the inner rotor are made to serve as a stator, the gear ratio relation remains the same as long as the above-described pole number relation is established. That is, it is possible to change the gear ratio by changing a portion that is fixed. From this a relative speed remains the same for the rotor and the stator. Thus, it is possible to change the gear ratio by rotating the fixed portion shown in this embodiment.

Figure 3A:
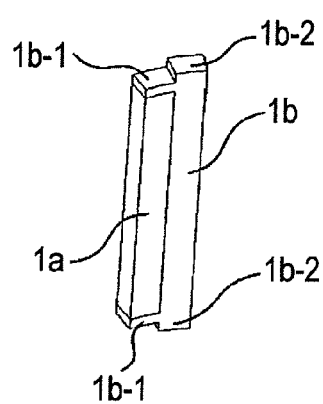
FIGS. 3A to 3D are diagrams showing the structure of a magnetic flux modulating section of a first embodiment of the invention.
Figure 3B:
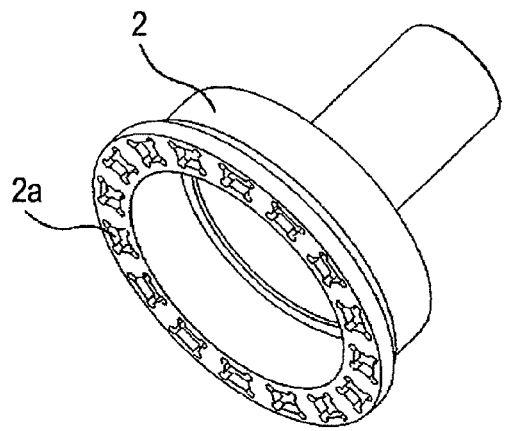
Figure 3C:
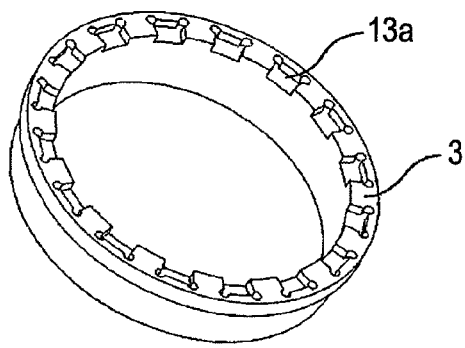
Figure 3D:
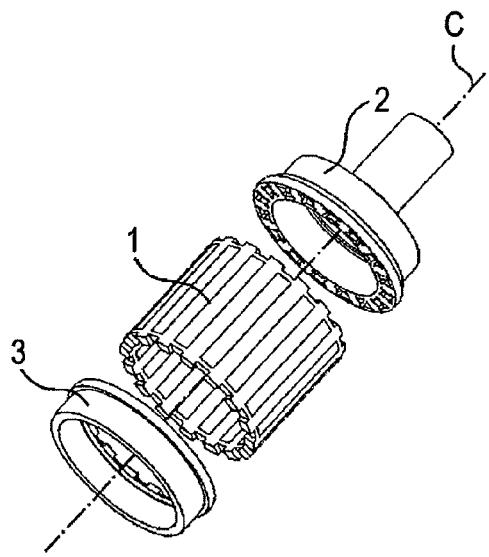

Next, a method for assembling the magnetic flux modulating section 1 in this embodiment and the effects thereof will be described by using FIGS. 3A to 3D. In FIGS. 3A to 3D, the structure of the magnetic flux modulating section 1 shown in FIG. 2 is shown in FIG. 3A, the structure of the output shaft-integrated bearing holding section 2 shown in FIG. 1 is shown in FIG. 3B, the structure of the non-output-side bearing holding section 3 is shown in FIG. 3C, and a perspective view in which the magnetic flux modulating section 1, the output shaft-integrated bearing holding section 2, and the non-output-side bearing holding section 3 are arranged along a center line c of the axis of rotation is shown in FIG. 3D. As shown in FIG. 3A, the magnetic flux modulating section 1 is formed of the magnetic member 1a made of a soft magnetic material and the non-magnetic member 1b. At this time, the magnetic member 1a has a three-dimensional structure obtained by extending, in an axial direction, a sector with a circular arc side in a circumferential direction, and the non-magnetic member 1b has a structure in which projections 1b-1 provided in a circumferential direction sandwich the magnetic member 1a from both sides in an axial direction. Furthermore, in the non-magnetic member 1b, projections 1b-2 are provided at both sides of the non-magnetic member 1b in an axial direction in such a way as to jut therefrom in an axial direction and not to be level with the projections 1b-1. The magnetic member 1a and the non-magnetic member 1b are bonded together with an adhesive or the like to form one piece, and the pieces thus obtained are connected in a circumferential direction to form the magnetic flux modulating section 1 shown in FIGS. 1 and 2. Moreover, as shown in FIG. 3B, recessed portions 2a are provided on the non-output shaft side of the output shaft-integrated bearing holding section 2 disposed on the output side in an axial direction, and, as shown in FIG. 3C, recessed portions 3a are also provided on the output shaft side of the non-output-side bearing holding section 3. By doing so, it is possible to achieve a structure in which the output shaft-integrated bearing holding section 2 and the non-output-side bearing holding section 3 are fitted over the magnetic flux modulating section 1 from both sides thereof by using the projections 1b-2 provided in the non-magnetic members 1b in an axial direction as shown in FIG. 3D. With this overall structure, even when a piece shown in FIG. 3A is produced as a single piece, it is possible to perform assembly with ease and obtain a structure having high strength. Moreover, by forming the non-magnetic member 1b by using a nonconductive material, as indicated by 1b of FIG. 3A, it is possible to provide electrical insulation between the magnetic member 1a and the bearing holding sections 2 and 3 by the non-magnetic projections 1b-1 located in a circumferential direction. Furthermore, when the magnetic flux modulating section 1 shown in FIGS. 1 and 2 and FIGS. 3A to 3D rotates as in this embodiment, by binding the outer periphery of the magnetic flux modulating section 1 with a tape or the like to prevent the magnetic members 1a from being scattered in a radial direction by the centrifugal force acting on the magnetic flux modulating section 1, it is possible to improve the radial strength.

Second Embodiment

Next, a second embodiment will be described by using FIGS. 4A to 4C.

In the magnetic flux modulating section 1 formed of the magnetic member 1a and the non-magnetic member 1b shown in FIG. 3A, the projections 1b-1 are provided in the non-magnetic member 1b in a circumferential direction, and the magnetic member 1a is fitted into a space between the projections 1b-1. As described in the first embodiment, in this case, since the magnetic flux modulating section 1 formed of the magnetic member 1a and the non-magnetic member 1b is integrated with the output shaft, the centrifugal force acts on the outside in a radial direction as a result of the rotation of the magnetic flux modulating section 1. Here, the circumferential length of the projections 1b-1 provided in the non-magnetic member 1b corresponds to the circumferential length of the magnetic member 1a. Since the circumferential length of the projections is inversely proportional to the strength thereof against the radial centrifugal force, it is necessary to shorten the circumferential length of the projections in order to improve the radial strength of the projections 1b-1. Therefore, an embodiment for solving the above-described problem is shown in FIGS. 4A to 4C.

In FIG. 4A, an assembly structure is shown, and projections 1c-1 are provided on both sides of a non-magnetic member 1c in a circumferential direction. With this structure, the magnetic member 1a is sandwiched between two non-magnetic members 1c and is bonded thereto with an adhesive or the like to form one piece. Incidentally, projections 1c-2 similar to the projections 1b-2 of the non-magnetic member 1b are provided.

The following is an assembly example. The magnetic member 1a is fitted into a space between the circumferential projections 1c-1 of the non-magnetic members 1c, and the non-magnetic members 1c and the magnetic members 1a are disposed in a circumferential direction while being fitted into the recessed portions 3a provided in the non-output-side bearing holding section 3 shown in FIG. 3C or the recessed portions 2a provided in the output shaft-integrated bearing holding section 2 shown in FIG. 3B. Then, the other bearing holding section (2 or 3) is fitted over the non-magnetic members 1c and the magnetic members 1a from the opposite side in an axial direction. In this way, the non-magnetic members 1c and the magnetic members 1a are fixed from both sides thereof. With this structure, the length of the circumferential projections 1c-1 of the non-magnetic member 1c is half the length of the projections 1b-1 of the non-magnetic member 1b of FIG. 3A. This allows the projections 1c-1 to have high strength against the radial centrifugal force. At this time, as shown in FIG. 4B, splitting the non-magnetic member 1c near the center thereof in a circumferential direction facilitates insertion into the recessed portions of the bearing holding sections and assembly.

FIG. 4C is a sectional view of the piece shown in FIG. 4A, the piece cut in an axial direction. As shown in FIG. 4C, the cross section viewed from an axial direction is the same as the structure of 1a and 1b of FIG. 2.

Third Embodiment

Next, a third embodiment will be described by using FIGS. 5A to 5C.

In the second embodiment, a structure is adopted in which the circumferential length of the circumferential projections 1c-1 of the magnetic flux modulating section 1 is reduced to half in order to improve the strength thereof also against the radial centrifugal force and the magnetic member 1a is sandwiched between the non-magnetic members 1c.

Figure 5A:
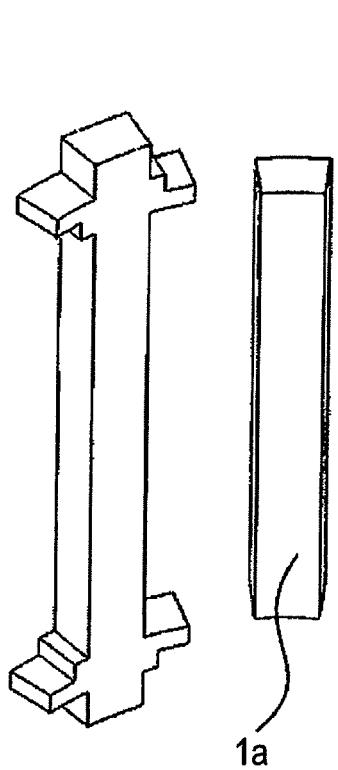
FIGS. 5A to 5C are diagrams showing the structural components of a magnetic flux modulating section of a third embodiment of the invention.
Figure 5B:
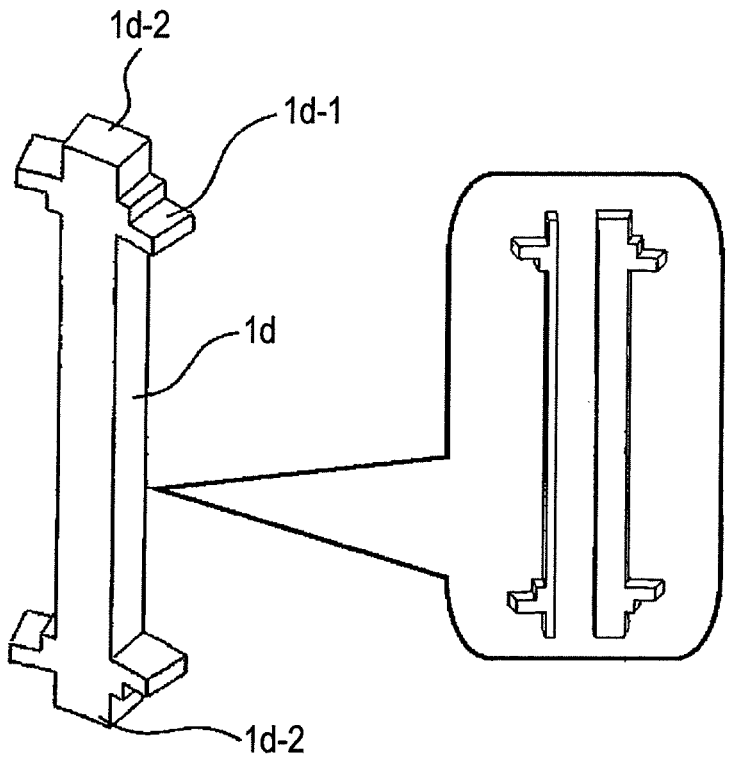

In this embodiment, for the purpose of further improving the strength of circumferential projections of a non-magnetic member against the radial centrifugal force and improving the adhesion between two non-magnetic members sandwiching the magnetic member 1a, a step is provided in the circumferential projections as indicated by 1d-1 of FIG. 5A to shorten the length of the circumferential projections equivalently and make an area in which non-magnetic members 1d are bonded together wider. Such a structure makes it possible to ensure higher strength against the radial centrifugal force acting on the circumferential projections 1d-1. Incidentally, projections 1d-2 similar to the projections 1b-2 of the non-magnetic member 1b are provided.

The following is an assembly example. As is the case with the second embodiment, the magnetic member 1a is fitted into a space between the circumferential projections 1d-1 of the non-magnetic members 1d, and the non-magnetic members 1d and the magnetic members 1a are disposed in a circumferential direction while being fitted into the recessed portions 3a provided in the non-output-side bearing holding section 3 shown in FIG. 3C or the recessed portions 2a provided in the output shaft-integrated bearing holding section 2 shown in FIG. 3B. Then, the output shaft-integrated bearing holding section 2 or the non-output-side bearing holding section 3, which is the other bearing holding section, is fitted over the non-magnetic members 1d and the magnetic members 1a from the opposite side in an axial direction. In this way, the non-magnetic members 1d and the magnetic members 1a are fixed from both sides thereof. When the magnetic member 1a is fitted into the non-magnetic member 1d, the magnetic member 1a is fixed thereto with an adhesive or the like. At this time, as shown in FIG. 5B, splitting the non-magnetic member 1d near the center thereof in a circumferential direction facilitates insertion into the recessed portions 2a and 3a of the bearing holding sections 2 and 3 and assembly.

Figure 5C:
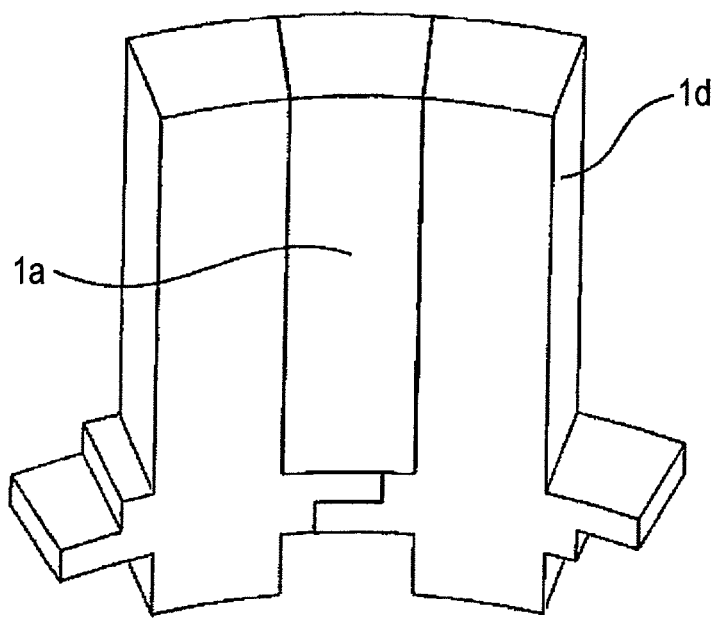

Moreover, FIG. 5C is a sectional view of the piece shown in FIG. 5A, the piece cut in an axial direction. As shown in FIG. 5C, the cross section viewed from an axial direction is the same as the structure of 1a and 1b of FIG. 2.

Fourth Embodiment

Next, a fourth embodiment will be described by using FIGS. 6A to 6C.

The non-magnetic members 1b in the magnetic flux modulating section 1 shown in FIG. 3A are provided with projections in an axial direction, and the non-magnetic members 1b are fitted into the recessed portions 2a and 3a provided in the bearing holding section 2 and 3 shown in FIGS. 3B and 3C in an axial direction and fixed. However, the magnetic members 1a shown in FIGS. 3A to 3D, FIGS. 4A to 4C, and FIGS. 5A to 5C are just put between the projections provided in the non-magnetic members 1b, 1c, and 1d in a circumferential direction. Therefore, it is desirable to reinforce the magnetic flux modulating section 1 against the radial centrifugal force by, for example, binding the outer periphery of the magnetic flux modulating section 1 with a tape.

In this embodiment, a method for preventing the magnetic members 1a from being scattered in a radial direction due to the radial centrifugal force by ingeniously designing the structure of the non-magnetic member is described. The non-magnetic members 1b, 1c, and 1d in the embodiments described earlier each have a constant circumferential width as shown in FIGS. 3A to 3D, FIGS. 4A to 4C, and FIGS. 5A to 5C. The non-magnetic members 1b, 1c, and 1d are modified to have a structure in which the circumferential widths are increased only on the radially inner and outer periphery sides to form a depression in a circumferential direction as indicated by 1e of FIG. 6A. The magnetic member 1a is fitted into the depression, and the pieces thus obtained are connected in a circumferential direction to form the magnetic flux modulating section 1. In the non-magnetic member 1e, projections similar to 1c-1 of FIG. 4A are used as circumferential projections. However, projections similar to the circumferential projections 1b-1 of FIG. 3A or projections similar to the circumferential projections 1d-1 of FIG. 5A may be used. Incidentally, also in this embodiment, projections 1e-2 similar to the projections 1b-2 of the non-magnetic member 1b are provided.

The following is an assembly example. As is the case with the second and third embodiments, the magnetic member 1a is fitted into a space between the circumferential projections 1e-1 of the non-magnetic members 1e, and the non-magnetic members 1e and the magnetic members 1a are disposed in a circumferential direction while being fitted into the recessed portions 3a provided in the non-output-side bearing holding section 3 shown in FIG. 3C or the recessed portions 2a provided in the output shaft-integrated bearing holding section 2 shown in FIG. 3B. Then, the output shaft-integrated bearing holding section 2 or the non-output-side bearing holding section 3, which is the other bearing holding section, is fitted over the non-magnetic members 1e and the magnetic members 1a from the opposite side in an axial direction. In this way, the non-magnetic members 1e and the magnetic members 1a are fixed from both sides thereof. When the magnetic member 1a is fitted into the non-magnetic member 1e, the magnetic member 1a is fixed thereto with an adhesive or the like. Furthermore, in this embodiment, the magnetic members 1a simply have to be held from the outside so as not to be affected by the radial centrifugal force. Although the circumferential widths are increased on both the inner and outer periphery sides in FIGS. 6A to 6C, a structure in which the circumferential width is increased only on the outer periphery side may be adopted. At this time, as shown in FIG. 6B, splitting the non-magnetic member 1e near the center thereof in a circumferential direction facilitates insertion into the recessed portions 2a and 3a of the bearing holding sections 2 and 3 and assembly.

Moreover, FIG. 6C is a sectional view of the piece cut in an axial direction. In this drawing, the magnetic member 1a is sandwiched between the non-magnetic members 1e and can be held by the projections formed on the radially inner and outer periphery sides.

These projections make it possible to hold the magnetic member 1a so as not to be affected by the radial centrifugal force.

Fifth Embodiment

Next, a fifth embodiment will be described by using FIGS. 7A to 7C.

In this embodiment, a method for preventing the magnetic members from being scattered in a radial direction due to the radial centrifugal force by ingeniously designing the shapes of the magnetic member and the non-magnetic member of the magnetic flux modulating section 1 is described.

Reference character 1f of FIG. 7A indicates the shape of the magnetic member, and reference character 1g of FIG. 7A indicates the shape of the non-magnetic member. In this embodiment, the radially inner width of the magnetic member 1f is greater than those of the magnetic members 1a shown in FIG. 2 to FIGS. 6A to 6C, and the radially outer width of the magnetic member 1f is smaller than those of the magnetic members 1a shown in FIG. 2 to FIGS. 6A to 6C. Accordingly, the non-magnetic member 1g has a smaller radially inner width and a greater radially outer width. By adopting a structure in which the magnetic member 1f is sandwiched between the non-magnetic members 1g, it is possible to prevent the magnetic members 1f from being scattered to the outside in a radial direction due to the radially outward centrifugal force which is produced when the magnetic flux modulating section 1 rotates.

In the non-magnetic member 1g, projections similar to 1c-1 of FIG. 4A are used as circumferential projections. However, projections similar to the circumferential projections 1b-1 of FIG. 3A or projections similar to the circumferential projections 1d-1 of FIG. 5A may be used. Incidentally, also in this embodiment, projections 1g-2 similar to the projections 1b-2 of the non-magnetic member 1b are provided.

The following is an assembly example. As is the case with the second to fourth embodiments, the magnetic member 1f is fitted into a space between the circumferential projections 1g-1 of the non-magnetic members 1g, and the non-magnetic members 1g and the magnetic members 1f are disposed in a circumferential direction while being fitted into the recessed portions 3a provided in the non-output-side bearing holding section 3 shown in FIG. 3C or the recessed portions 2a provided in the output shaft-integrated bearing holding section 2 shown in FIG. 3B. Then, the output shaft-integrated bearing holding section 2 or the non-output-side bearing holding section 3, which is the other bearing holding section, is fitted over the non-magnetic members 1g and the magnetic members 1f from the opposite side in an axial direction. In this way, the non-magnetic members 1g and the magnetic members 1f are fixed from both sides thereof. When the magnetic member 1f is fitted into the non-magnetic member 1g, the magnetic member 1f is fixed thereto with an adhesive or the like. At this time, splitting the non-magnetic member 1g near the center thereof in a circumferential direction facilitates insertion into the recessed portions of the bearing holding sections and assembly.

Also in this embodiment, as is the case with the fourth embodiment, by forming a step in the circumferential projections of the non-magnetic member 1g, it is possible to improve strength and improve adhesion by increasing the joint area between the non-magnetic members and between the non-magnetic member and the magnetic member.

What is claimed is:

1. A magnetic gear mechanism comprising a plurality of rotors or stators having a plurality of magnetic poles, the rotors or stators between which a group of pole pieces for magnetic flux modulation is provided, wherein
   an output shaft-integrated bearing holding section provided with recessed portions, a magnetic flux modulating section formed of pole piece holding sections, each having a projection and being split, sandwiching a pole piece, the pole piece holding sections formed of a non-magnetic and nonconductive member and arranged in a circumferential direction, and a non-output-side bearing holding section provided with recessed portions form a structure in which the magnetic flux modulating section is fitted into the output shaft-integrated bearing holding section and the non-output-side bearing holding section, and
wherein
   a projection is provided in each pole piece holding section at both ends thereof in an axial direction and only on one side thereof in a circumferential direction.

2. The magnetic gear mechanism according to claim 1, wherein
   the projection provided in the pole piece holding section in a circumferential direction is formed in the shape of a step and the projection of another pole piece holding section lying next to the pole piece holding section with the pole piece sandwiched therebetween is also formed in the shape of a step, and
   the two pole piece holding sections are joined together by the step-like projections thereof.

* * * * *